(12) United States Patent
Hernandez et al.

(10) Patent No.: US 7,564,810 B2
(45) Date of Patent: Jul. 21, 2009

(54) METHOD AND SYSTEM FOR MANAGING POWER CONSUMPTION OF A NETWORK INTERFACE MODULE IN A WIRELESS COMPUTING DEVICE

(75) Inventors: Edwin Hernandez, Gainesville, FL (US); Arun Ayyagari, Seattle, WA (US); Timothy M. Moore, Bellevue, WA (US); Krishna Ganugapati, Redmond, WA (US); Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1022 days.

(21) Appl. No.: 10/141,662

(22) Filed: May 8, 2002

(65) Prior Publication Data

US 2003/0210658 A1    Nov. 13, 2003

(51) Int. Cl.
*G08C 17/00* (2006.01)
(52) U.S. Cl. .................. 370/311; 455/574; 340/7.32; 370/252; 713/323
(58) Field of Classification Search .............. 370/311, 370/318; 455/574
See application file for complete search history.

(56) References Cited

U.S. PATENT DOCUMENTS

| | | | |
|---|---|---|---|
| 5,850,181 A | | 12/1998 | Heinrich et al. |
| 5,924,017 A * | | 7/1999 | Pinter et al. ............. 340/7.36 |
| 6,571,111 B1 * | | 5/2003 | Mayo et al. ............... 455/574 |
| 6,785,247 B1 * | | 8/2004 | Lee ........................... 370/311 |
| 6,788,697 B1 * | | 9/2004 | Aweya et al. ............. 370/412 |
| 6,807,159 B1 * | | 10/2004 | Shorey et al. ............. 370/318 |
| 6,807,165 B2 | | 10/2004 | Belcea |
| 6,842,428 B2 * | | 1/2005 | Chen et al. ................ 370/252 |
| 6,873,844 B2 * | | 3/2005 | Ang et al. .................. 455/424 |
| 6,889,275 B2 * | | 5/2005 | Vandecappelle et al. .... 710/107 |

(Continued)

FOREIGN PATENT DOCUMENTS

JP    2001-119338    4/2001

OTHER PUBLICATIONS

Guo et al., "Low power distributed MAC for ad hoc sensor radio networks," Proceedings of IEEE Global Telecommunications Conference (GLOBECOM '01), vol. 5, Nov. 25-29, 2001, retrieved from http://bwrc.eecs.berkeley.edu/People/Faculty/jan/publications/p137.pdf, on Feb. 3, 2005.

(Continued)

*Primary Examiner*—Chi H Pham
*Assistant Examiner*—Mohammad S Adhami
(74) *Attorney, Agent, or Firm*—Wolf, Greenfield & Sacks, P.C.

(57) ABSTRACT

A power management scheme for use in a wireless device reduces the power consumption of the network interface module of the wireless device by selectively putting the network interface module into a low-power state for an idle time. The length of the idle time is calculated such that the amount of delayed traffic data accumulated is expected to be less than or equal to a pre-selected threshold when the network interface module is put in the low-power state for the calculated idle time. The amount of delayed traffic data as a function of the idle time is modeled using average inter-arrival and service rates that are derived from traffic statistics data.

26 Claims, 6 Drawing Sheets

U.S. PATENT DOCUMENTS

| | | | |
|---|---|---|---|
| 6,912,228 B1* | 6/2005 | Dahlman et al. | 370/441 |
| 7,002,918 B1* | 2/2006 | Prieto et al. | 370/252 |
| 7,246,057 B1* | 7/2007 | Sundqvist et al. | 704/219 |
| 2001/0031626 A1* | 10/2001 | Lindskog et al. | 455/67.3 |
| 2003/0156542 A1* | 8/2003 | Connor | 370/236 |
| 2003/0203740 A1 | 10/2003 | Bahl et al. | |
| 2004/0179469 A1 | 9/2004 | Attar et al. | |
| 2004/0181569 A1 | 9/2004 | Attar et al. | |
| 2004/0208176 A1* | 10/2004 | Goderis et al. | 370/389 |
| 2005/0152272 A1* | 7/2005 | Bjoerkman et al. | 370/235 |
| 2005/0163103 A1* | 7/2005 | Malomsoky et al. | 370/352 |

OTHER PUBLICATIONS

Intel, "Sample Installation Scenarios," Intel Wireless Gateway, pp. 1-3 (Oct. 9, 2001), retrieved from http://support.intel.com/support/wireless/wlan/gateway/sb/CS-008078.htm, on Feb. 3, 2005.
Benini, Luca, et al., "Monitoring System Activity for OS-Directed Dynamic Power Management", *In Proceedings of 1998 ACM ISLPED*, pp. 185-190.
Benini, Luca, et al., "Dynamic Power Management of Electronic Systems", in *Proceedings of the 1998 IEEE/ACM ICCAD*, Nov. 8-12, 1998, San Jose CA, pp. 696-702.
Hinckley, K., et al., "Sensing Techniques for Mobile Interaction", *ACM UIST 2000 Symposium on User Interface Software & Technology*, CHI Letters 2 (2), pp. 91-100.
*Intel Microsoft Toshiba*, "Advanced Configuration and Power Interface", Revision 1.0, Feb. 2, 1999, 323 pages.
Simunic, Tajana, et al., "Dynamic Power Management for Portable Systems", *In Proceedings of ACM MOBICOM 2000*, Aug. 2000, Boston, MA pp. 11-19.
Simunic, Tajana, et al., "Dynamic Voltage Scaling and Power Management for Portable Systems", *In Proceedings of ACM DAC 2001*, Aug. 2001, pp. 524-529.
Fleishman, Glenn, New Wireless Standards Challenge 802.11b, The O'Reilly Network, at http://www.oreillynet.com/lpt/a//wireless/2001/05/08/standards.html (Jun. 8, 2001), pp. 1-4.
Flickenger, Rob, 802.11B Tips, Tricks and Facts, The O'Reilly Network, retrieved from http://www.oreillynet.com/lpt/a//wirelss/2001/03/02/802.11b_facts_.html (Mar. 2, 2001), pp. 1-3.
Press Release, "Atheros Communications, Atheros Ships Combo Rolling Three WLAN Standards into a Single Solution", retrieved from www.atheros.com/news/combo.html (Mar. 11, 2002) pp. 1-3.
Atheros Communications, AR5001X Combo WLAN Solution Brochure, retrieved from www.atheros.com pp. 1-2.
Nobel , Carmel, For WLAN, It's 802.11bm Eweek retrieved from www.eweek.com/print_article /0.3668.a=18648.00.asp (Nov. 19, 2001) pp. 1-2.
Nandagopal, T., et al., "A Unified Architecture for the Design and Evaluation of Wireless Fair Queueing Algorithms", ACM MobiCom 1999, in proceedings of *The Fifth Annual ACM/IEE International Conference on Mobile Computing and Networking* (Aug. 1999) pp. 132-142.
Keshav, S., "On the Efficient Implementation of Fair Queueing" *Internetworking, Research and Experience*, vol. 2, No. 3., 157-173 (1991).
Bharghavan, V., et al., "Fair Queuing in Wireless Networks: Issues and Approaches", *IEEE Personal Communications Magazine*, pp. 44-53 (Feb. 1999).
Parekh, A.K., et al., "A Generalized Processor Sharing Approach to Flow Control in Integrated Services Networks: The Single-Node Case", *IEEE/ACM Transactions on Networking*, vol. 1, No. 3, pp. 344-357 (Jun. 1993).
Parekh, A.K., et al., "A Generalized Porcessor Sharing Approach to Flow Control in Integrated Services Networks: The Multiple Node Case", *IEEE/ACM Transactions on Networking*, vol. 2, No. 2, pp. 137-150 (Mar. 1994).
Ng, T.S., "Packet Fair Queueing: Algorithms for Wireless Networks with Location-Dependent Errors", *Proceedings of IEEE INFOCOM '98, The Conference on Computer Commutations vol. 3, Seventh Annual Joint Conference of the IEEE Computer and Communications Societies*, pp. 1103-1111 (Mar. 1998).
Liu, Jun, et al., "Using Loss Pairs to Discover Network Properties", *ACM SIGCOM Internet Measurement Workshop*, 2001, 12 pages.
Zhang, Yin, et al., "On the Constancy of Internet Path Properties", *SIGCOM Internet Measurement Workshop*, 2001, 15 pages.
Lai, Kevin, et al., "Measuring Link Bandwidths Using A Deterministic Model of Packet Delay", *In Proceedings of ACM SIGCOM 2000*, 12 pages.
Balakrishnan, Hari, et al., "Analyzing Stability in Wide-Area Network Performance", *In Proceedings of CAN SIGMETRICS Conference on Measurement & Modeling of Computer Systems*, Seattle, WA Jun. 1997, 11 pages.
Yavatkar, R., et al., "SBM (Subnet Bandwidth Manager): A Protocol for RSVP-based Admission Control Over IEEE 802-style Networks", IETF RFC 2814, retrieved from http://www.faws.org/rfcs/rfc2814.html on May 19, 2002.
Breslau, Lee, et al., "Endpoint Admission Control: Architectural Issues and Performance", *In Proceedings of ACM SIGCOMM 2000*, pp. 57-69.
Chiasserini, Carla, F., "Combining Paging with Dynamic Power Management", in *IEEE INFOCOM* 2001, pp. 996-1004.
Shih, Eugene, et al., "Wake on Wireless: An Event Driven Energy Saving Strategy for Battery Operated Devices", MOBICOM '02, Sep. 23-26, 2002, pp. 1-12.
"*Specification of the Bluetooth System*", vol. 1, Dec. 1, 1999, (1,082 pages).
Miller, Brent, et al., "*Mapping Salutation Architecture APIs to Bluetooth Service Discovery Layer*" (White Paper), vol. 1.0, IBM Corporation, Jul. 1, 1999, (pp. 1-26).
*IEEE Standard, 802.11, Part 11: Wireless LAN Medium Access Control (MAC) and Physical Layer (PHY) Specifications*, 1$^{st}$ Edition 1999 (512 pages).
O'Hara, Bob, et al., *IEEE 802.11 Handbook A Designer's Companion*, Dec. 1999, (174 pages).
Rigney, C., et al., "*Remote Authentication Dial in User Service (Radius)*", The Internet Society, Jun. 2000, (pp. 1-59).
Aboda, B., et al., "*RFC 2716, PPP EAP TLS Authentication Protocol*". The Internet Society, Oct. 1999, (pp. 1-19).
Blunk, L., et al., RFC 2284, *PPP Extensible Authentication Protocol (EAP)*, The Internet Society, Mar. 15, 2000, (pp. 1-12).
*IEEE 802.11 Security White Paper*, vol. 1., Windows Network Infrastructure team, Microsoft Corporation, Mar. 15, 2000, (23 pages).
*IEEE 802.1X Supported Scenarios*, Windows Network Infrastructure team, Microsoft Corporation, vol. 1, Apr. 7, 2000, (7 pages).
Mettala, Riku, et al., "*Bluetooth Protocol Architecture*" (White paper), vol. 1.0, Nokia Mobile Phones, Sep. 29, 1999.
Muller, T., *Bluetooth Security Architecture*, (White paper), vol. 1.0, Jul. 15, 1999.
Steve Kleynhans, *IBM: Back in the PC Game*, ZDNet, at http://www.zdnet.com/filters/printerfriendly/0,6061,2868907-92,00.html (last visited Sep. 16, 2002).
*Wayport's Successful Trial of Microsoft Windows XP and 801.1x Forecasts a More Secure Environment for Wireless Users*, HITEC Online 2002 Edition, at http://online.hitec.org/news/4009856,2000343,htm (last visted Sep. 16, 2002).
*Wireless LAN Computing with IBM Personal Devices*, IBM White Paper, IBM Personal Systems Group, Dec. 2001, 9 pg.
Barb Bowman, *Unplugged and Unwired*, Microsoft Corp. at http://www.microsoft.com/windowsxp/expertzone/columns/bowman/june11.asp (last visited Sep. 16, 2002).
*Windows XP Segment Analysis for the IBM ThinkPad Notebook Platform*, Strategic Relationship Marketing, Oct. 2001, 1 pg.
*Boingo Launches Nationwide WI-FI Service*, Boingo Wireless Press Releases at http://www.boingo.com/pr/pr3.html (last visited Sep. 20, 2002).
*Boingo Wireless Announces Founding and Funding*, Boingo Wireless Press Releases at http://www.boingo.com/pr/pr1.html (last visted Sep. 20, 2002).
*802.11b has reached "escape velocity"*, Boingo Wireless Market Overview at http://www.boingo.com/marketoverview.html (last visited Sep. 20, 2002).

*Wireless where you want: Wi-Fi is the guerilla revolution of wireless computing*, The Seattle Times: Wireless where you want at http://seattletime.nwsource.com/html/businesstechnology/134402814_wirelesslan11.html (last visited Sep. 20, 2002).

*Wireless Technology*, Wireless Technology, at http://www.microsoft.com/hwdev/wireless/ (last visited Dec. 8, 2000).

Daniel L. Lough et al., *A Short Tutorial on Wireless LANs and IEEE 802.11*, IEEE 802.11 Short Tutorial at http://www.computer.org/students/looking/summer97/ieee802.htm (last visited Dec. 12, 2000).

Mubashir Alam, *Descriptive Analysis of IEEE 802.11 Standard for Wireless Networks*, at http://triton.cc.gatech.edu/ubicomp.257 (last visited Dec. 12, 2000).

*Zero Configuration Networking* (*zeroconf*), at http://www.zeroconf.org/ (last visited Dec. 12, 2000).

Stuart Cheshire, *Dynamic Configuration of IPv4 link-local addresses*, Apple Computer, at http://www.zeroconf.org/draft-ietf-zeroconf-ipv4-linklocal-00.txt (last visited Dec. 12, 2002).

H. Hattig, editor, *Zeroconf Requirements draft-ietf-zeroconf-reqts-06.txt*, Intel Corp. at http://www.ietf.org/internet-drafts/draft-ietf-zeroconf-reqts.06.txt (last visited Dec. 12, 2002).

*Enabling IEEE 802.11 Networks With Windows "Whistler"*, at http://www.micorsoft.com/hwdev/wireless/IEEE802Net.htm (last visited Dec. 8, 2000).

Lettieri et al.; "Advances in Wireless Terminals," *IEEE Personal Communications*, vol. 6, No. 1, (Feb. 1999), pp. 6-19.

Yung-Hsiang Lu et al.; "Requester-Aware Power Reduction," *IEEE*; Sep. 20, 2000 (Sep. 2, 2000), pp. 18-23.

Benini et al.; "System-level Dynamic Power Management," Low-Power Design, 1999; Proceedings. IEEE Alessandro Volta Memorial Workshop On Como, Italy Mar. 4-5, 1999, Los Alamitos, CA, USA, IEEE Comput. Soc, US, Mar. 4, 1999, pp. 23-31.

\* cited by examiner

METHOD AND SYSTEM FOR MANAGING POWER CONSUMPTION OF A NETWORK INTERFACE MODULE IN A WIRELESS COMPUTING DEVICE

TECHNICAL FIELD OF THE INVENTION

The present invention relates generally to wireless computing devices, and more particularly to the power management in wireless computing devices having batteries for power sources.

BACKGROUND OF THE INVENTION

Wireless computing devices, such as laptop computers, personal digital assistant devices, etc., that communicate with other devices through wireless transmissions are becoming increasingly popular. Wireless computing devices are typically battery-powered. Since the amount of power a battery can provide is rather limited, how to minimizing power consumption to extend the operation time of the device powered by the battery is an important issue for those devices.

One component in a wireless device that consumes a significant amount of power is the network interface module, which handles wireless transmission and reception of network communication data. It has been estimated that on the average about 20% of the total power consumed by a wireless laptop computer is spent on wireless LAN interface communications. Most of that energy is used for wireless data transmissions and receptions. In order to reduce the power consumption, most wireless devices employ a power-management scheme that allows the network interface module to be switched between different power states with different power consumption levels. Those states include high-power states in which the transmitter is powered up to enable the transmission and reception of network communication data, and low-power states in which the network interface module is put in a sleep mode or turned-off. The time period in which the network interface module is put in a low-power state is often referred to as the "idle time." Since the transmitter is turned off when the network interface module is in a low-power state, the transmission of network traffic data is delayed, and the delayed traffic data have to be temporarily stored in queue, waiting to be transmitted when the network interface module is switched back to the high-power state. A significant amount of delayed network traffic data may be accumulated in the transmission queue if the interface network card is put in the low-power states too often or for too long. Thus, it is necessary to strike a reasonable balance between saving the battery power and avoiding undue network traffic congestion. Accordingly, there is a need for a new power management scheme for determining when to switch the network interface module of a wireless device into a low-power state and for how long to provide sufficient power saving without causing excessive delay and accumulation of the network traffic (i.e., traffic congestion).

SUMMARY OF THE INVENTION

In view of the foregoing, the present invention provides a power management scheme for operating the network interface module of a wireless computing device. The power management scheme uses network traffic statistical data to derive parameters of a mathematical model for predicting the amount of delayed traffic data that will accumulate as a function of the length of time the network interface module stays in a low-power state. The parameters may include, for instance, an average inter-arrival rate of traffic data packets at the network interface module and an average service rate of the system in processing the traffic data packets. Based on the mathematical model and the derived parameters, the wireless device calculates the value of a target idle time for which the predicted amount of accumulated traffic data in the queue is less than or equal to a predetermined threshold.

If the wireless device is associated with an access point of an infrastructure wireless network, the network interface module of the device is set to the low-power state for the calculated target idle time. If the device is associated with an ad hoc network, the device first broadcasts its target idle time in the ad hoc network and listens to the target idle times calculated and broadcast by the other wireless devices in the ad hoc network. The device then selects the smallest idle time broadcast by the wireless devices in the network as a common idle time for the devices, and switches the network interface module to the low-power state for that common idle time.

BRIEF DESCRIPTION OF THE DRAWINGS

While the appended claims set forth the features of the present invention with particularity, the invention and its advantages may be best understood from the following detailed description taken in conjunction with the accompanying drawings, of which:

DETAILED DESCRIPTION OF PREFERRED EMBODIMENTS

This invention operates in a wireless device having a network interface module for wirelessly accessing a wireless network and a power source, such as a battery pack or the like, that has a limited amount of energy stored therein. Since the network interface module can consume a significant amount of power with its transmitter turned on, it is desirable to reduce the power consumption by putting the network interface module in a low-power state in which the transmitter and receiver are in a reduced power consumption state. The invention provides a power management scheme to do so. Prior to describing the invention in detail with reference to FIGS. 2-6, an exemplary computing device in which the invention may be implemented is first described with reference to FIG. 1.

The invention may be implemented in a system employing various types of machines, including cell phones, hand-held devices, wireless surveillance devices, microprocessor-based programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

Figure 1:
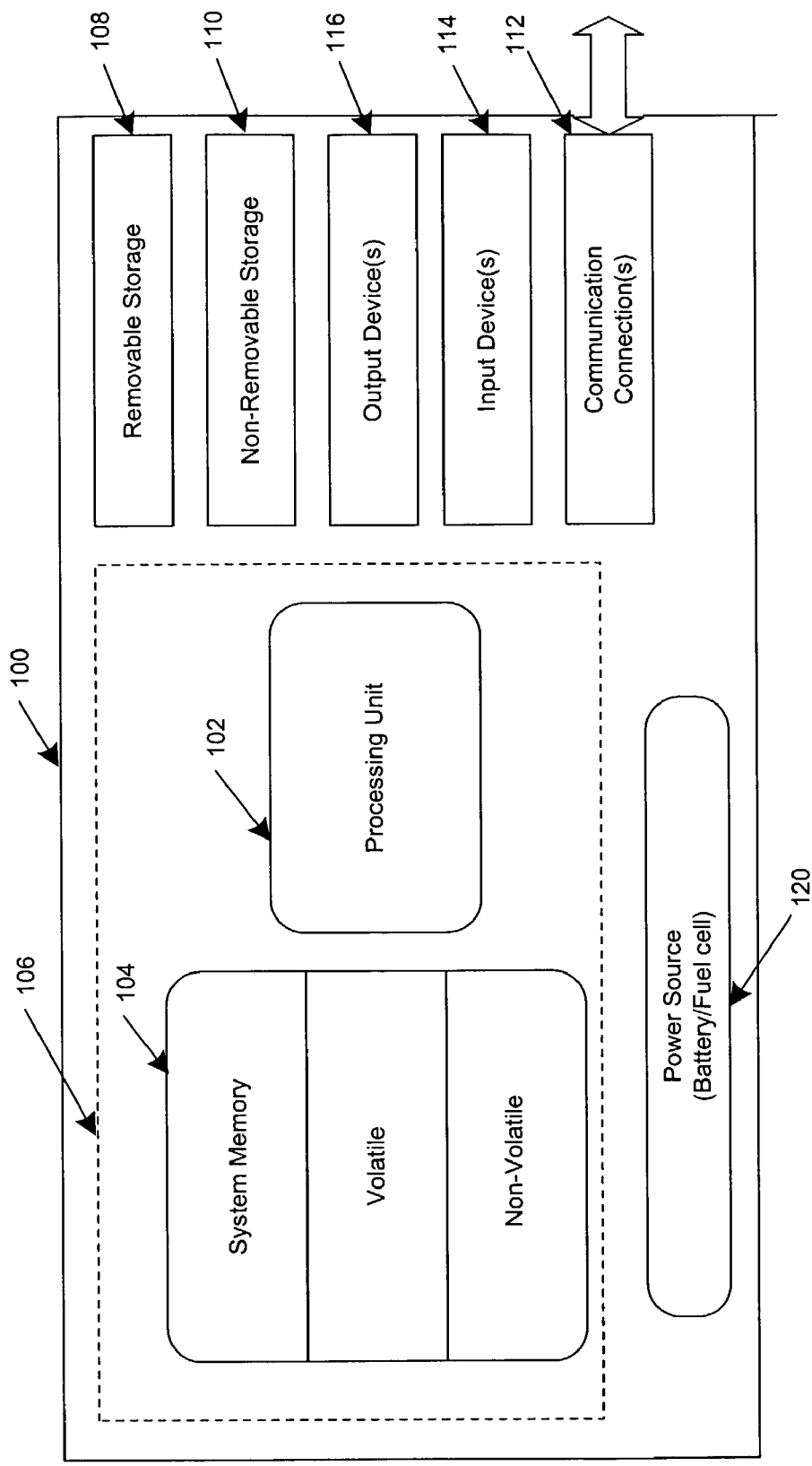
FIG. 1 is a schematic diagram illustrating the architecture of an exemplary computer device in which an embodiment of the invention may be implemented.

FIG. 1 shows an exemplary computing device 100 for implementing an embodiment of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer readable storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

The device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

Figure 2:
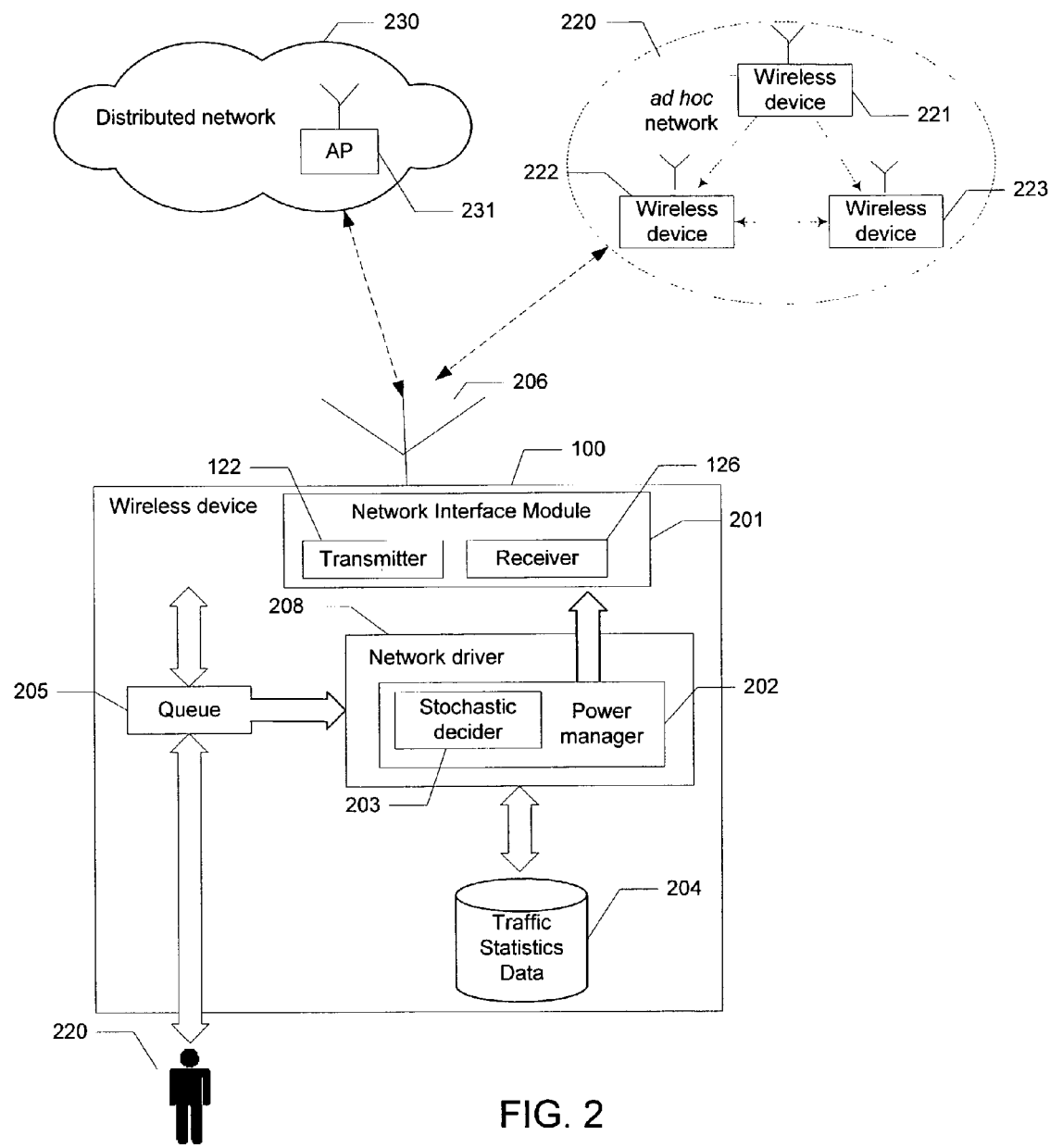
FIG. 2 is a schematic diagram illustrating an exemplary operation environment for a wireless computing device that implements an embodiment of the power management scheme of the invention.

In keeping with the intended application of the invention, the device 100 is configured as a wireless mobile device. To that end, the device 100 is provided with a portable power source 120, such as a battery pack, a fuel cell, or the like. The power source 120 provides power for computations and wireless data transmissions by the device 100. As shown in FIG. 2, the wireless computing device 100 further includes a network interface module 201 for wirelessly communicating with different types of wireless networks. The network interface module includes a transmitter 122, which is coupled to an antenna 206 for transmitting data wirelessly over a suitable frequency channel. A receiver 126 is also coupled to the antenna 206 for receiving communication packets wirelessly transmitted from the networks that the device is communicating with. The network interface module 201 and the antenna 206 are part of the communication connections 112 in FIG. 1. In one embodiment, the network interface module 201 employs wireless configuration service over the IEEE 802.11 wireless connections to ease network configuration, including infrastructure networks and ad hoc networks. An exemplary network interface module is PCMCIA wireless card. It will be appreciated that the physical configuration of the network interface module is not critical to the invention. For instance, the network interface module does not have to reside on a separate card and may be included on the motherboard of the computer or even possibly built into the processor in the future.

Through the wireless network interface module, the wireless computing device 100 may communicate with different types of wireless networks. For instance, in the illustrated environment of FIG. 2, the wireless device 100 may be connected wirelessly to an infrastructure network 230 through an access point 231 thereof. The wireless device 100 may also be part of a peer-to-peer network 220, also referred to as an ad hoc network, that includes other wireless devices, such as the wireless devices 221, 222, and 223. Before connecting to either the access point 231 of the infrastructure network or the ad hoc network 220, the wireless device 100 may be in a state of searching for an association by periodically scanning for probe request signals transmitted by the access point or other devices.

A network driver 208 controls the operation of the network interface module 201. The network driver 208 is either part of the operating system of the wireless device 100 or a separate executable program running on the wireless device 100. An exemplary network driver is the Windows Management Instrument (WMI) of Microsoft Corporation. The network driver 208 includes a power manager 202 for managing the power consumption of the network interface module in accordance with the invention as described below. A system queue 205 is used to store communication packets from a user 210 that are to waiting to be sent out by the transmitter 122. The system queue is also used to store packets received by the receiver 126.

The device 100 further includes a database 204 for storing traffic statistics data, which are used in the power management scheme of the invention for determining a target idle time for the network interface module as will be described in greater detail below. The queue 205 and the traffic statistics database 204 may reside in the system memory 104, the removable storage 108 or the non-removable storage 110 in FIG. 1. In one implementation, the traffic statistic data are maintained by the operating system, and counters can be set as object identifiers that represent discrete distributions of information measured at different inter-arrival as well as service rates.

A stochastic decider 203 of the power manager 202 analyzes, using stochastic methods, the traffic statistics data in the database 204 to identify the historical pattern of the wireless traffic and make power management decisions. Based on the decisions provided by the stochastic decider 203, the power manager 202 dynamically switches the network interface module 201 between a high-power state in which the transmitter is powered up for transmitting packets and a low-power state in which the transmitter is turned off to save energy.

As mentioned above, the network interface module 201 has multiple power states, including a high-power state for transmitting or receiving wireless data packets, and a low-power state. In the low-power state, the network interface module is either in a sleep mode or turned off. The selection between the sleep mode and the off mode typically depends on the surrounding environment. For instance, if a sophisticated authentication mechanism like IEEE 802.1x is used during the session, the NIM may be turned into sleep mode only. In contrast, in a home where authentication is simple or none, the NIM may be turned off completely for higher power savings.

In the high-power state, because the transmitter 122 is powered up, a significant amount of power is consumed. In contrast, in the low-power state, the transmitter and the receiver are in reduced power consumption states, resulting in a significant reduction of power consumption. Whether to set the network interface module 201 into a high-power state or a low-power state should depend on the amount of traffic data accumulated in the system queue to avoid serious delay in processing the queued traffic data. For example, when the amount of the queued traffic data is large, the network interface module should operate in the high-power state to process the queued traffic data. On the other hand, when the amount of the queued traffic data is small, the network interface module 201 may be allowed to "doze" or be turned-off to save power. To achieve efficient power usage, the profile of power states of the network interface module 201 should ideally follow the profile of the time-dependent generation of the traffic data, which generally has random characteristics in real applications but can be predicted statistically.

In keeping with this concept, the present invention provides a power management scheme that uses historical traffic statistics data to analyze the traffic generation pattern up to the current point of time, and uses the results of the analysis to predict how much undelivered network traffic will be accumulated if the network interface module is put in the low-power state for a period of time (called the "idle time"). A target idle time that does not result in excessive delay in processing the accumulated traffic data (i.e., "traffic congestion") is then selected.

More particularly, the amount of unprocessed traffic data that is expected to accumulate in the system queue when the interface module is put in the low-power state is predicted with a mathematical model. The parameters of that mathematical model are derived by analyzing the traffic statistics data. Based on the mathematical model with the derived parameters, a calculation is performed to determine a target idle time for which the expected traffic accumulation is less than or equal to a pre-determined threshold.

In this regard, the pre-determined threshold represents a practical limit of the amount of traffic that will be delayed due to the turning off of the transmitter. In this regard, the operating system and applications have buffers to store and maintain information while transferring it via a network connection. The threshold may be selected, for example, to correspond to the minimum buffer size that can be held without causing packet loss during a scheduled power savings state on the wireless card.

In one embodiment, the parameters of the mathematical model that are derived from the traffic statistics data include an average inter-arrival rate and an average data service rate. That mathematical model and the derivation of these two parameters are described in greater detail below. Generally, congestion is the amount of packets that cannot be serviced prior to a timeout, or packets that are lost because the available buffer size is exceeded. The inter-arrival rate refers to the rate that the packets get to the server from a remote destination. Although packets may arrive to a host at a certain rate, the packets that are being sent by the host are serviced at a different rate that corresponds to the average time the network process a specific packet. Under transient network conditions data traffic is delayed at certain points when packets arrive at a higher rate than they are being serviced by the network. In general, in a networking environment this might happen at the access point level where many mobile hosts might be connected and the average service rate per network node is temporarily reduced. Ad-hoc networks with intra- or inter-network connectivity might not encounter the problems that are present in shared-media access (Access Point). For a stable network, the average service rate is greater than or equal to the average arrival rate under steady state conditions.

Returning to FIG. 2, in the illustrated system, the power manager scheme is carried out under the control of the power manager 202. In one embodiment, the stochastic decider 203 of the power manager periodically retrieves the traffic statistics data in the database 204 and performs stochastic analyses on the data. The periodicity is a fraction of a pre-set scan time interval for the wireless device to scan for wireless communication signals from other devices. For example, the wireless configuration service for IEEE 802.11 protocol specifies a scan time of 60 seconds for a wireless device and a probe request interval period of 0.1 second. In that case, the power manager may, for example, make the decision of whether to put the interface module in the low-power state at some multiple periodic interval that is a function of the probe request interval.

In one embodiment, the traffic statistics data include a set of historical inter-arrival rates and a set of historical service rates. Each historical inter-arrival rate represents a number of traffic data elements (such as packets) that arrived at the network interface module in a certain unit-time interval in the past. Each service-rate represents a number of processed traffic data by the network interface module in a unit-time interval. To statistically describe the retrieved distribution data, an inter-arrival distribution function and a service-rate distribution function are defined. In particular, the inter-arrival rate distribution function models the dependency of the inter-arrival rates on the time interval, while the service rate distribution models the dependency of the service rates on the time interval. From the retrieved historical traffic distribution data, the stochastic decider 203 extracts a set of parameters including an average inter-arrival rate and an average service-rate based on their respective distribution functions. From the extracted average inter-arrival and service rates, the stochastic decider 203 can predict the amount of traffic data that will be added to the system queue if the network interface module is put in the low-power state for a given length of idle time. Generally, more power is saved if the idle time is made longer. The amount of delayed traffic data, however, also increases with the idle time. Thus, it is necessary to select an idle time that is reasonably long to allow substantial power saving but not too long to cause unacceptable traffic jam. The balance is achieved by setting a target idle time that is expected to cause an amount of delayed traffic that is up to a pre-selected threshold. After the determination of the idle time, the power manager 202 measures the current inter-arrival rate and service rates of the network interface module and updates the historical distribution data stored in the historical database 204.

If the idle time determined is either invalid or zero, the network interface module 201 is kept in the high-power state, which is the default power-state of the network interface module 201. If the determined idle time is valid, whether the network interface module will be put in the low-power state for the calculated target idle time depends on whether the wireless device is connected to an infrastructure network or to an ad hoc network. If the wireless device 100 is connected to the access point 231 of the infrastructure network, the power manager 202 switches the network interface module 201 to the low-power state for the calculated idle time. On the other hand, if the wireless device 100 is associated with the ad hoc network 220, the wireless device 100 broadcasts its calculated idle time in the ad hoc network 220, and listens to the idle time values broadcast by the other wireless devices 221, 222 and 223. Each of the wireless devices in the ad hoc network, including the device 100, then selects the smallest one of the broadcast idle time values as the idle time to be used.

Thereafter, the network interface module 201 is set to the low-power state and kept in the low-power state for the smallest idle time by the power manager 202.

Sometimes the wireless device 100 may find that it is not connected to an access point of an infrastructure network or another device in an ad hoc network. In that situation, the wireless device 100 periodically enters a scan mode in which it listens for probe request and probe response signals from other devices it may connect to. In one embodiment, the power management scheme defines a duty cycle including an active period and a sleep period, where the sum of the two periods equal to a fixed scan time, such as the scan time specified by the wireless configuration service for IEEE 802.11. Thus, in each cycle, the network interface module 201 stays in the low-power state for the sleep time for reduced power and then switched to the high-power state for the active period, during which it performs the scanning.

Figure 3A:
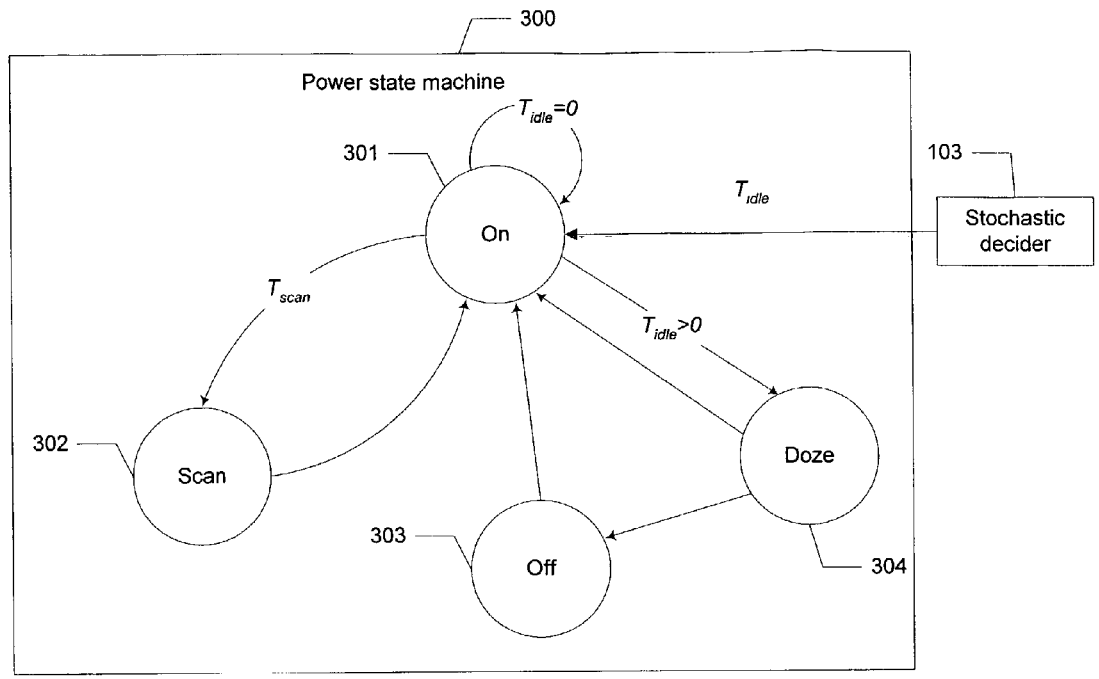
FIG. 3a is a schematic diagram showing a state-machine that models a wireless device that implements an embodiment of the power management scheme of the invention.

In carrying out the power management scheme, the wireless device 100 may be modeled as a power state machine 300 as illustrated in FIG. 3a. The power state machine 300 comprises two high-power states: "on" and "scan." The "on" state 301 represents the state when the network interface module 201 (FIG. 2) is receiving or transmitting wireless data packets and the "scan" state 302 represents the state when the network interface module is scanning for connecting to a network. In addition to the high-power states, the power state machine 300 further includes two low-power states: "doze" and "off." The "doze" state 304 represents the state when the network interface module is idle (i.e., not transmitting or receiving communication data), and the "off" state 303 represents the state when the network interface module is turned-off. The network interface module can transit between these power states, and the stochastic decider 103 makes decisions on whether to cause the transitions.

After the start of the system, the network interface module is set to the "on" state 301 as default. At this point, the wireless device is not yet connected to a network. The interface module periodically (every scan time interval $T_{scan}$) enters the "scan" state 302 and scans networks by sending probe request signals according to the IEEE 802.11 standard. After the wireless device forms a wireless network connection, the stochastic decider 103 periodically calculates a target idle time based on the traffic statistics data in the database 204.

If the calculated idle time is zero or an invalid value, the network interface module 201 stays at the "on" state 301. Otherwise, if the calculated idle time is valid and the wireless device is connected to an infrastructure network, the network interface module transitions to the "doze" state 304 and stays in that state for the calculated idle time to save power. After the idle time is up, the network interface module transits back to the "on" state 301. During the idle time, the network interface module may transit to the "off" state 303. When the idle time is up, the network interface module transits back to the "on" state 301.

Figure 3B:
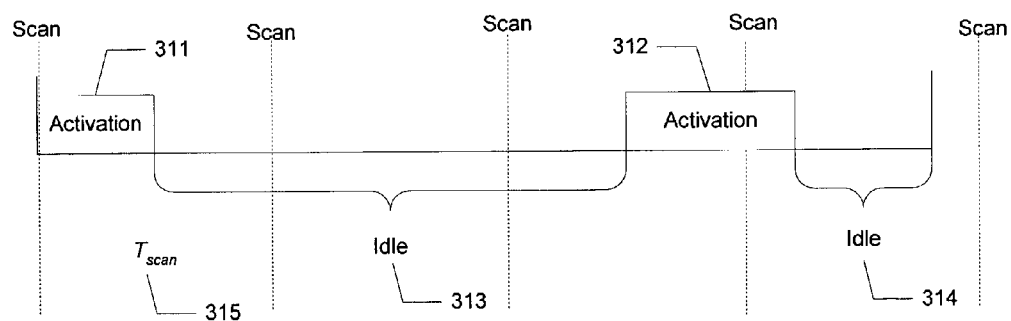
FIG. 3b is a timeline showing periods of active and idle states of the network interface module of the wireless device.

As described above, the idle time is calculated based on a mathematical model that predicts the amount of traffic delay as a function of the idle time and a pre-selected threshold of traffic delay. The calculated idle time may be longer than the scan time specified by the wireless configuration service for IEEE 802.11, which is shown in FIG. 3b. In FIG. 3b, the set of dash scan lines represent the scan times 315 according to the wireless configuration service for IEEE 802.11. An idle time 313 follows an active time 311, and another idle time 314 follows another active time 312. During active periods, the network interface module is in a high-power state. In the idle time periods, the network interface module operates in low-power states. In the illustrated example, the idle time 313 extends across scan time lines. The idle time may be smaller than the scan time interval, such as the idle time 314, which is within one scan interval.

Figure 4:
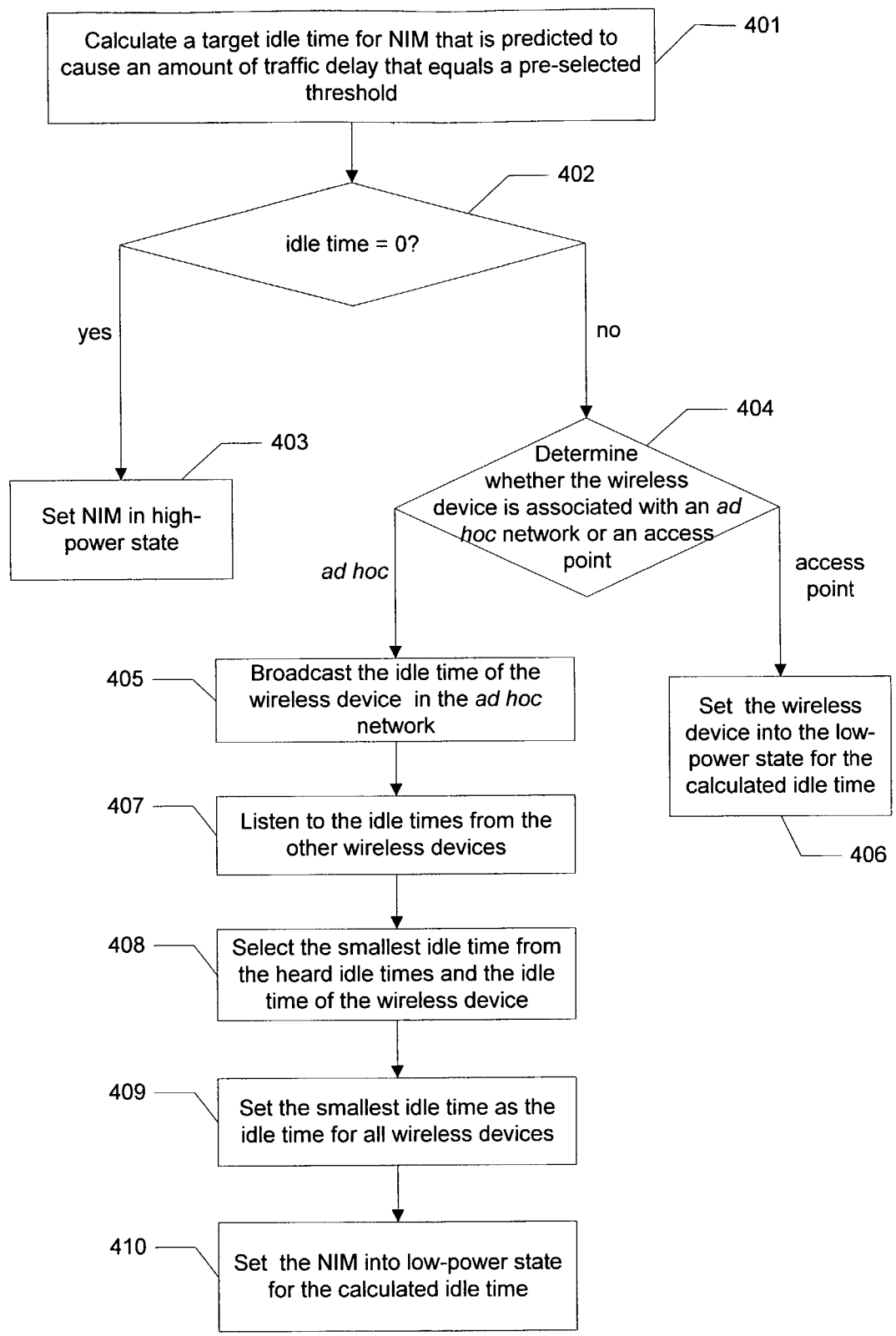
FIG. 4 is a flow chart showing the steps executed for managing the power consumptions in a wireless device connected to either an access point or an ad hoc network.

FIG. 4 summarizes the steps of one embodiment of the power management scheme. Staring from the, the idle time of the network interface module is calculated (step 401) to determine an idle time value that is expected to cause an amount of delayed traffic data that equals to a pre-selected threshold. The validity of the calculated idle time is determined (step 402). If the idle time is zero, the network interface module is set to the high-power state at the (step 403). Otherwise, it is determined whether the wireless device is associated with an ad hoc network or an access point is determined (step 404). If it is determined that the wireless device is associated with an access point, the network interface module is set to the low-power state for the calculated idle time (step 406). On the other hand, if the wireless device is associated with an ad hoc network, each wireless device in the ad hoc network determines and broadcasts its own idle time, (step 405), and listens to the broadcast idle time from the other wireless devices in the ad hoc network (step 407). The smallest idle time of the broadcast idle times is then selected (step 408) and used as the common idle time for all network interface modules in all of the network devices in the ad hoc network (step 409). Each network interface module is then put in the low-power state for that common idle time (step 410).

Figure 5:
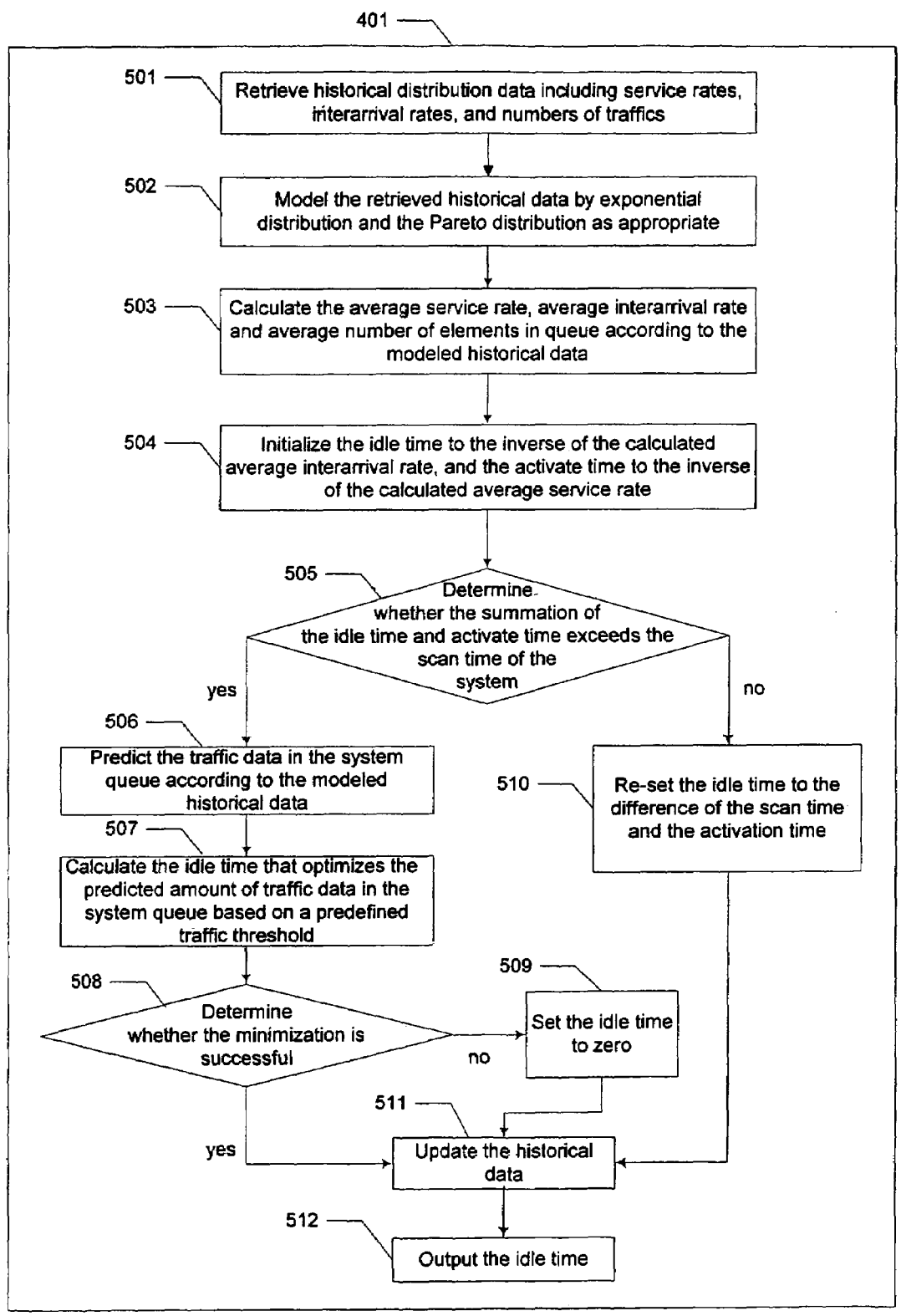
FIG. 5 is a flow chart showing the steps executed for predicting the idle time for the network interface module of the wireless device.

The following description describes the mathematical modeling used in one embodiment for calculating a target idle time for the network interface module. Referring to FIG. 5, step 501, traffic statistics data are retrieved from the database 204 (FIG. 3) for analysis. The traffic statistics data include inter-arrival rates each representing the number of traffic data arrived at the network interface module in a unit-time interval, and service rates each representing the number of traffic data processed by the network interface module in a unit-time interval. These retrieved inter-arrival rates and service rates are modeled with an exponential distribution function and a Pareto distribution function as shown in Equations 1 and 2, respectively (step 502).

$$Pr_{exp} = 1 - e^{-\lambda_0 t} \quad \text{(equation 1)}$$

$$Pr_{Pareto} = 1 - \left(\frac{\alpha}{t}\right)^{\beta}, \quad \alpha, \beta \geq 0, t \geq \alpha \quad \text{(equation 2)}$$

where $\lambda_0$, $\alpha$, and $\beta$ are variables to be determined from the data, and t is the elapsed time. By applying the exponential and the Pareto distribution functions to the retrieved data of inter-arrival rates and service rates, respectively, the average inter-arrival rate of requests $\lambda_{ave}$ and the average service rate $\mu_{ave}$ are extracted (step 503). In particular, the average inter-arrival rate $\lambda_{ave}$ is calculated as follows:

$$\lambda_{ave} = \sum_{i=1}^{N} \lambda_i Pr_{exp} = \sum_{i=1}^{N} \lambda_i (1 - e^{\lambda_0/\lambda_i}) \quad \text{(equation 3)}$$

wherein $\lambda_i$ is the ith inter-arrival rate. The average service rate $\mu_{ave}$ is calculated as follows:

$$\mu_{ave} = \sum_{i}^{N} \mu_i Pr_{Pareto} = \sum_{i}^{N} \mu_i \beta \alpha^\beta \mu_i^{-\beta-1} = \int_\alpha^\infty \beta \alpha^\beta \mu^{-\beta-1} d\mu = \frac{\alpha\beta}{\beta-1} \quad \text{(equation 4)}$$

The idle time $T_{idle}$ is initialized to the inverse of the average inter-arrival rate of request $\lambda_{ave}$ and the activation time $T_{on}$, to the inverse of the average service rate $\mu_{ave}$ (step 504), as shown respectively in equations 5 and 6.

$$T_{idle} = 1/\lambda_{ave} \quad \text{(equation 5)}$$

$$T_{on} = 1/\mu_{ave} \quad \text{(equation 6)}$$

Given the initialized idle time and activation time, it is determined (step 505) whether the summation of the idle time and activation time exceeds the scan time $T_{scan}$ specified by wireless configuration service for IEEE 802.11. If it is not, indicting that the traffic data in the system queue may be larger, wherein the idle time $T_{idle}$ is re-set to the difference of the scan time $T_{scan}$ and the activation time $T_{on}$ (step 510), as shown in equation 7.

$$T_{idle} = T_{scan} - T_{on} \quad \text{(equation 7)}$$

The historical distribution information is updated (step 511) by collecting the current traffic statistical distribution information including the current inter-arrival rates, service rates and number of traffic data in the system queue and saving the collected distribution data into the database 204 in FIG. 2. The idle time $T_{idle}$ is then provided as an output and the calculation process is terminated (step 512). The equations above are used for modeling and simulation purposes, and may be used as a tool to set initial thresholds.

If the sum of the initialized idle time and activation time exceeds the scan time interval specified by IEEE 802.11, indicating that the amount of the traffic data in the system queue in the near future may be small and the network interface module may doze for a relatively long period, the idle time calculation process continues. The stochastic decider predicts the amount of traffic data in the system queue Q according to the modeled historical distribution data (step 506). The traffic data has two contributions, one from the wireless device, represented by $N_{wd}$, and another one from the traffic data of another wireless device, for example, an access point or a wireless device in an ad hoc network, represented by $N_{ap}$. $N_{wd}$ may be solved by equation 8.

$$N_{wd} = k_p + \lambda_{ave} T_{scan} - \mu_{ave} T_{on} \quad \text{(equation 8)}$$

where $k_p$ is the number of residue traffic data in the system queue of the wireless device. The term $\lambda_{ave} T_{scan}$ represents the average number of traffic data arrived during the scan time, and the term $\mu_{ave} T_{on}$ represents the average number of traffic data processed by the wireless device and have been sent out. Similarly, $N_{ap}$ may be calculated as following.

$$N_{ap} = \mu_{ave} T_{scan} - \lambda_{ave} T_{on} \quad \text{(equation 9)}$$

where the term $\mu_{ave} T_{scan}$ indicates the average number of traffic data processed by the other wireless device during the scan period, and the term $\lambda_{ave} T_{on}$ represents the average number of traffic data arrived at the other wireless device during the period of activation. The difference between the two terms provides the expected average number of traffic data transmitted to the wireless device. Combining equations 8 and 9, the predicted amount of traffic data in the system queue can be expressed as:

$$Q = N_{wd} + N_{ap} = \lambda_{ave} T_{idle} - \mu_{ave} T_{idle} + k_p \quad \text{(equation 10)}$$

According to the invention, the network interface module may be set to the low-power state if the expected amount of delayed traffic data in the system queue is small. To that end, a pre-selected traffic threshold $\epsilon$ is used to represent an upper limit of acceptable amount of delayed traffic data. For instance, the $\epsilon$ may have been selected to be 1500 bits. The expected amount of traffic Q is set equal to $\epsilon$ as in equation 11, and the idle time is then obtained according to equation and 12 (step 507).

$$Q = N_{wd} + N_{ap} = \lambda_{ave} T_{idle} - \mu_{ave} T_{idle} + k_{p=\epsilon} \quad \text{(equation 11)}$$

$$T_{idle} = (\epsilon - k_p)/(\lambda_{ave} - \mu_{ave}) \quad \text{(equation 12)}$$

If equation 12 does not yield a positive solution of $T_{idle}$ (step 508), the idle time is set to zero (step 509). A positive value, on the other hand, indicates a valid idle time. The network traffic distribution information is updated (step 511). The stochastic decider provides the idle time to the power manager (step 512).

Figure 6A:
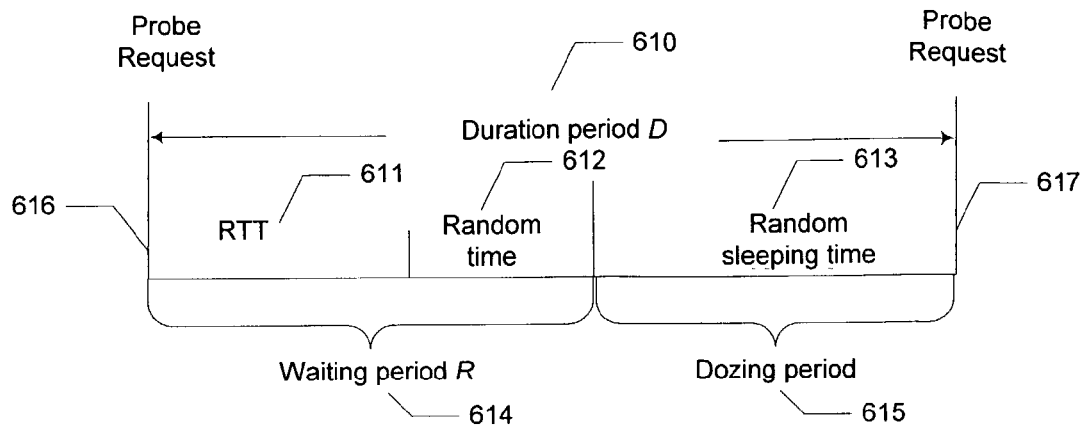
FIG. 6a is a timeline showing a duty cycle for the operation of the network interface module in which the interface module scans for probe request signals from other wireless devices.

As mentioned above, in addition to managing power consumptions in wireless devices while they are connected to a network, the power management scheme also periodically puts the wireless network interface module in the low-power state when the wireless device has not yet connected to a wireless network. This aspect of the power management scheme is now discussed with reference to FIGS. 6a and 6b. To reduce the power consumption of the network interface module of the wireless device when the device is not yet connected to a network, the network interface module goes through a duty cycle as shown in FIG. 6a The duty cycle includes sending a probe request signal 616, waiting for a waiting period R 614 for the network interface module waiting for responses to the probe request signal, and dozing for an idle period 617. The duration of the duty cycle 610 is represented by D. The waiting period has two components, a round-trip-time period RTT 611 and a random time 612. The idle time 615 is selected randomly to avoid synchronization of the network interface module with the other wireless interface modules.

Figure 6B:
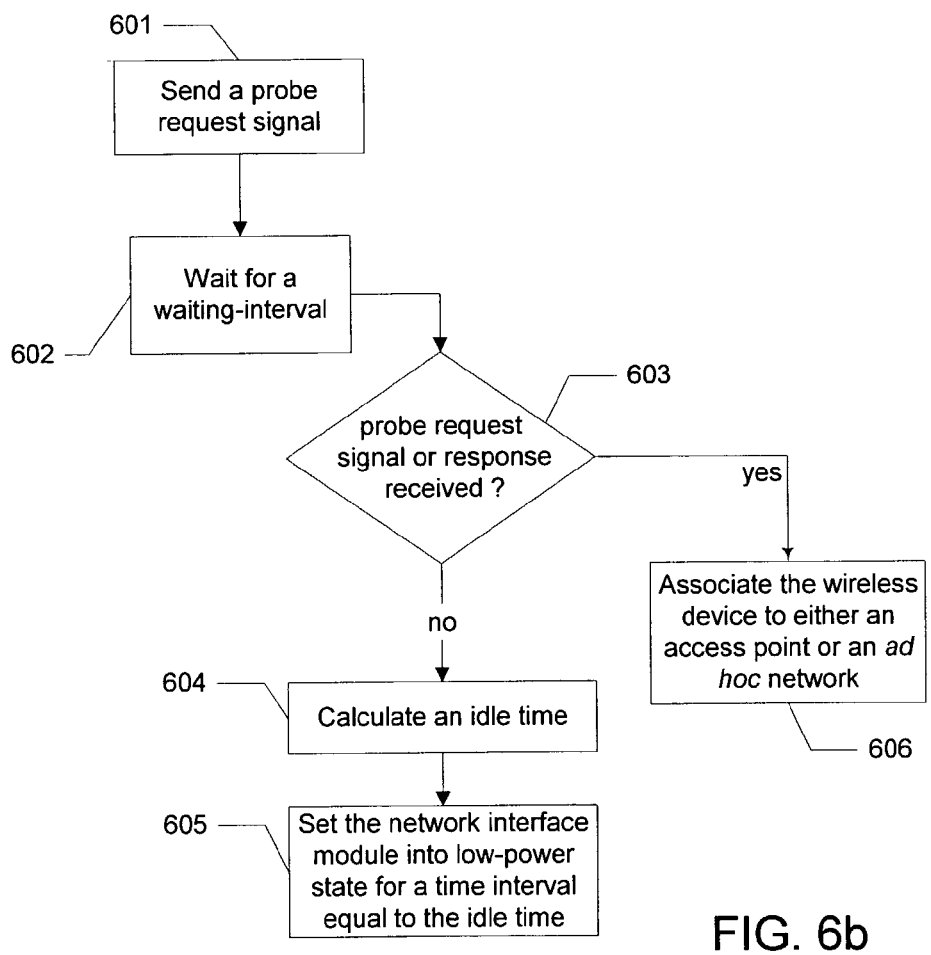
FIG. 6b is a flow diagram showing an exemplary method for managing the power consumptions in a wireless device before the wireless device connects to a wireless network.

Referring to FIG. 6b, to find a network it can connect to, the wireless device periodically sends a probe request signal (step 601) followed by waiting for the waiting-time (step 602).

During the waiting period, the network interface module determines whether a probe request signal from another wireless device or a response to the probe request signal it sent out is received (step 603). The amount of expected power saved as a function of the idle time is described below. The network interface module is put in the doze mode for the idle time (step 605). If either a probe request signal or a response is received for another device during the waiting period (step 603), the wireless device connects to the network (step 606). In this situation, the power management scheme as discussed in FIG. 4 and FIG. 5 is applied to the wireless device.

In the following, a way to estimate the power saved as a function of the length of the idle time is discussed. It is assumed that a first wireless device is in a vicinity of a second wireless device, and the two wireless devices are trying to communicate with each other by sending probe request signals. The probability X of the second wireless device receives the probe request sent by the first wireless device can be expressed as X=R/D, wherein R is the waiting period and D is the duration of the duty cycle as shown in FIG. 6a. The probability of the first wireless device receives a probe request from the second wireless device during the waiting period R is also X. Then the probability of the two wireless devices receives probe request from each other in one duty cycle including waiting period and dozing period can be expressed as: $1-(1-X)^2$. Therefore, the average number N of the duty cycles for the two wireless devices associated with each other is, $N=1/[1-(1-X)^2]$. Then the time T required for the two wireless devices associated with each other is, $T=N\times D=D/[1-(1-R/D)^2]$. Since D is fixed to the scan time specified by the wireless configuration service for IEEE 802.11, R is used to adjust time T. As an example, setting D equal to 60 seconds, by selecting R to 20 second, 67% of the power will be saved.

What is claimed is:

1. A method for managing power consumption of a computing device having a network interface module for transmitting and receiving network communication data, the computing device comprising a storage area for storing accumulated network communication data, the method comprising:

at least one processor analyzing traffic statistics data to derive at least one parameter of a model that establishes a relationship between idle time and a quantity of delayed traffic data that is predicted to accumulate in the storage area as a function of time when the network interface module is put in a low-power state in which the network interface module stops transmitting network communication data; and the at least one processor calculating a target idle time for the network interface module based on the model with the at least one parameter, wherein puffing the network interface module in the low-power state for the target idle time is predicted by the model to result in a non-zero quantity of delayed traffic data in the storage area that is less than or equal to a pre-selected threshold, the threshold being selected based on the size of the storage area such that the quantity of delayed traffic data does not exceed the size of the storage area;

wherein the model comprises at least one equation that determines the idle time using the threshold, wherein the target idle time is calculated using the at least one equation and using the at least one parameter, and wherein the at least one parameter of the model is a prediction regarding future traffic through the network interface module.

2. A method as in claim 1, further including:

determining that the device is connected to an access point of an infrastructure network; and switching the network interface module into the low-power stare for the target idle time.

3. A method as in claim 1, wherein the computing device is a wireless device, and further including:

determining that the wireless device is connected to an ad hoc wireless network;

broadcasting the target idle time to other wireless devices in the ad hoc wireless network;

receiving target idle times calculated and broadcast by the other wireless devices in the ad hoc wireless network;

selecting a smallest one of the broadcast target idle times as a common idle time for the wireless devices in the ad hoc wireless network; and switching the network interface module into the low-power state for the common idle time.

4. A method as in claim 1, wherein the at least one parameter of the model includes an average inter-arrival rate and an average service rate, the average service rate being the average rate at which data is transmitted by the network interface module, and wherein the step of analyzing the traffic statistics data includes:

retrieving the traffic statistics data including a set of historical inter-arrival rates for data received by the network interface module, a set of historical service rates for data transmitted by the network interface module, and a set of numbers representing a quantity of traffic data in the system queue;

modeling the historical inter-arrival rates using a first distribution function, and the historical service rates using a second distribution function; and deriving the average inter-arrival rate and the average service rate based on the first and second distribution functions, respectively.

5. A method as in claim 4, further including updating the traffic statistics data by collecting a current inter-arrival rate and a current service rate.

6. The method of claim 4, wherein the first distribution function is an exponential distribution function.

7. A method as in claim 4, wherein the second distribution function is a Pareto distribution function.

8. A computer-readable storage medium having computer-executable instructions for performing steps for managing power consumption of a computing device having a network interface module for transmitting and receiving network communication data, the computing device comprising a storage area for storing accumulated network communication data, the steps comprising:

analyzing traffic statistics data to derive at least one parameter of a model that establishes a relationship between idle time and a quantity of delayed traffic data that is predicted to accumulate in the storage area as a function of time when the network interface module is put in a low-power state in which the network interface module stops transmitting network communication data; and calculating a target idle time for the network interface module based on the model with the at least one parameter, wherein putting the network interface module in the low-power state for the target idle time is predicted by the model to result in a non-zero quantity of delayed traffic data in the storage area that is less than or equal to a pre-selected threshold, the threshold being selected based on the size of the storage area such that the quantity of delayed traffic data does not exceed the size of the storage area;

wherein the model comprises at least one equation that determines the idle time using the threshold, wherein the target idle time is calculate using the at least one equation and using the at least one parameter, and wherein the at least one parameter of the model is a prediction regarding figure traffic through the network interface module.

9. A computer-readable medium as in claim 8, having further computer-executable instructions for performing the steps of:
   determining that the device is connected to an access point of an infrastructure network; and
   switching the network interface module into the low-power state for the target idle time.

10. A computer-readable medium as in claim 8, wherein the computing device is a wireless device, and having further computer-executable instructions for performing the steps of:
   determining that the wireless device is connected to an ad hoc wireless network;
   broadcasting the target idle time to other wireless devices in the ad hoc wireless network;
   receiving target idle times calculated and broadcast by the other wireless devices in the ad hoc wireless network;
   selecting a smallest one of the broadcast target idle times as a common idle time for the wireless devices in the ad hoc wireless network; and
   switching the network interface module into the low-power state for the common idle time.

11. A computer-readable medium as in claim 8, wherein the at least one parameter of the model includes an average inter-arrival rate and an average service rate, the average service rate being the average rate at which data is transmitted by the network interface module, and wherein the step of analyzing the traffic statistics data includes:
   retrieving the traffic statistics data including a set of historical inter-arrival rates for data received by the network interface module, a set of historical service rates for data transmitted by the network interface module, and a set of numbers representing a quantity of traffic data in the system queue;
   modeling the historical inter-arrival rates using a first distribution function, and the historical service rates using a second distribution function; and
   deriving the average inter-arrival rate and the average service rate based on the first and second distribution functions, respectively.

12. A computer-readable medium as in claim 11, having further computer-executable instructions for performing the step of updating the traffic statistics data by collecting a current inter-arrival rate and a current service rate.

13. A computer-readable medium as in claim 11, wherein the first distribution function is an exponential distribution function.

14. A computer-readable medium as in claim 11, wherein the second distribution function is a Pareto distribution function.

15. A computing device comprising:
   a network interface module for transmitting and receiving network communications;
   a storage area for storing accumulated network communication data; and
   a power management system comprising:
      a traffic statistics database for storing traffic statistics data including a set of historical inner-arrival rates for data received by the network interface module and a set of historical service rates for data transmitted by the network interface module; and
      a power manager for selectively setting the network interface module into a low-power state, the power manager having a stochastic decider for analyzing the traffic statistics data to derive an average inter-arrival rate and an average service rate and calculating a target idle time for the network interface module based on the average inter-arrival and service rates, the average inter-arrival rate being the average rate at which data is received at the network interface module and the average service rate being the average rate at which data is transmitted by the network interface module, the target idle time being predicted to result in a quantity of delayed network traffic data in the storage area that is less than or equal to a pre-selected threshold when the network interface module is put in the low-power state for the target idle time, the quantity of delayed traffic data being non-zero, the threshold being selected based on the size of the storage area such that the quantity of delayed traffic data does not exceed the size of the storage area.

16. A computing device as in claim 15, wherein the power manager is programmed to switch the network interface module into the low-power state for the target idle time when the computing device is connected to an access point of an infrastructure network.

17. A computing device as in claim 15, wherein the computing device is a wireless device, wherein the power manager is programmed to perform the steps of:
   determining that the wireless device is connected to an ad hoc wireless network;
   broadcasting the target idle time to other wireless devices in the ad hoc wireless network;
   receiving target idle times calculated and broadcast by the other wireless devices in the ad hoc wireless network;
   selecting a smallest one of the broadcast target idle times as a common idle time for the wireless devices in the ad hoc wireless network; and
   switching the network interface module into the low-power state for the common idle time.

18. A computing device as in claim 15, wherein the stochastic decider is programmed to perform the steps of:
   modeling the historical inter-arrival rates using a first distribution function, and the historical service rates using a second distribution function; and
   deriving the average inter-arrival rate and the average service rate based on the first and second distribution functions, respectively.

19. A computing device as in claim 18, wherein the first distribution function is an exponential distribution function.

20. A computing device as in claim 18, wherein the second distribution function is a Pareto distribution function.

21. A computing device as in claim 18, wherein the power manager is further programmed to update the traffic statistics data by collecting a current inter-arrival rate and a current service rate.

22. A computing device comprising:
   a power source for powering the computing device;
   a network interface module for transmitting and receiving network communications;
   a storage area for storing accumulated network communication data;
   a traffic statistics database for storing traffic statistics data including a set of historical inter-arrival rates for data received by the network interface module and a set of historical service rates for data transmitted by the network interface module; and a power manager for selectively setting the network interface module into a low-power state, the power manager having a stochastic decider for analyzing the traffic statistics data to derive an average inter-arrival rate and an average service rate and calculating a target idle time for the network interface module based on the average inter-arrival and service rates, the average inter-arrival rate being the average rate at which data is received at the network interface module and the average service rate being the average rate at which data is transmitted by the network interface module, the target idle time being predicted to result in a quantity of delayed network traffic data in the storage area that is less than or equal to a pre-selected threshold when the network interface module is put in the low-power state for the target idle time, the quantity of delayed traffic data being non-zero, the threshold being selected based on the size of the storage area such that the quantity of delayed traffic data does not exceed the size of the storage area.

23. A computing device as in claim 22, wherein the computing device is a mobile device, wherein the power source includes a battery pack.

24. A computing device as in claim 22, wherein the power source is a fuel cell, 25. A computing device as in claim 22, wherein the power manager is programmed to switch the network interface module into the low-power stat; for the target idle time when the computing device is connected to an access point of an infrastructure network.

26. A computing device as in claim 22, wherein the computing device is a wireless device, wherein the power manager is programmed to perform the steps of:
  determining that the wireless device is connected to an ad hoc wireless network;
  broadcasting the target idle time to other wireless devices in the ad hoc wireless network;
  receiving target idle times calculated and broadcast by the other wireless devices in the ad hoc wireless network;
  selecting a smallest one of the broadcast target idle times as a common idle time for the wireless devices in the ad hoc wireless network; and
  switching the network interface module into the low power state for the common idle time.

* * * * *